UNITED STATES PATENT OFFICE.

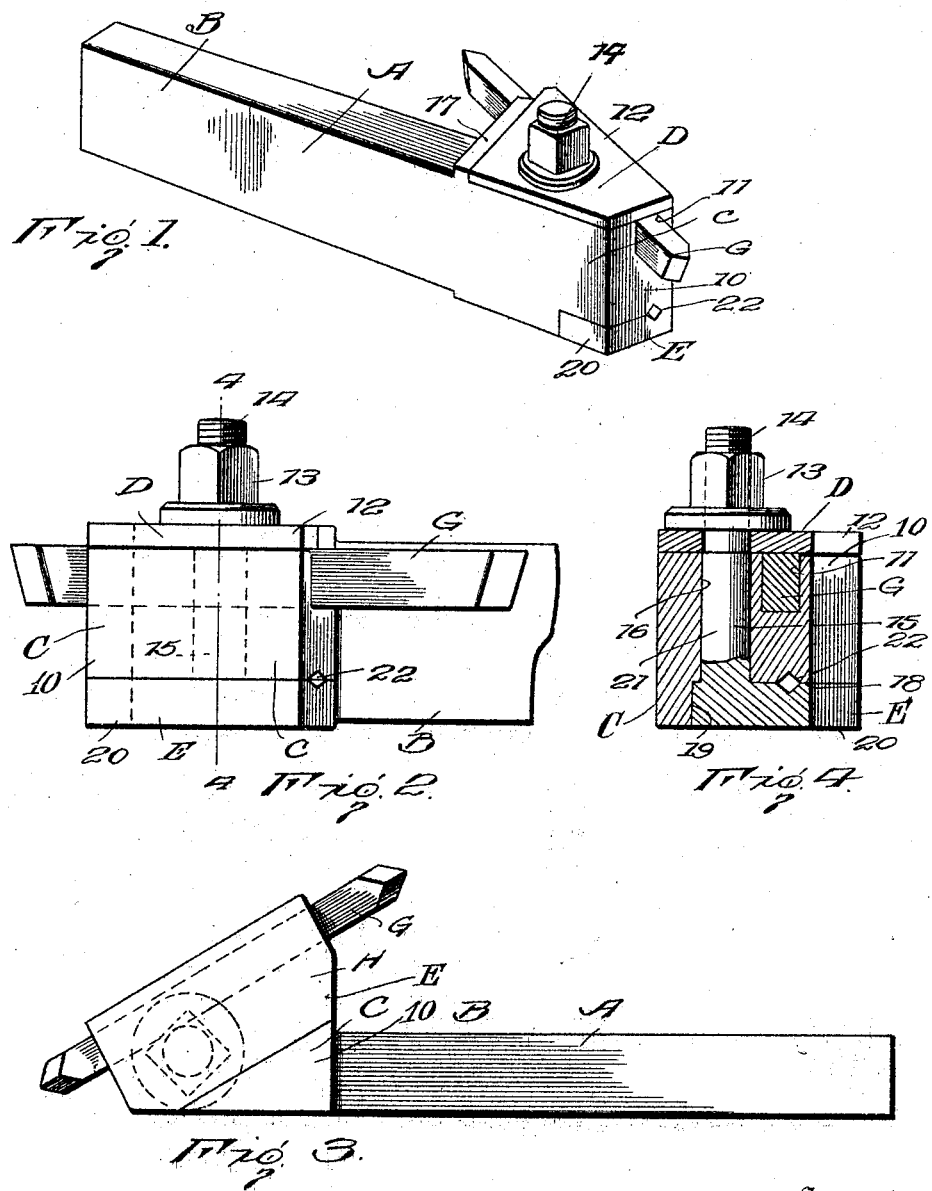

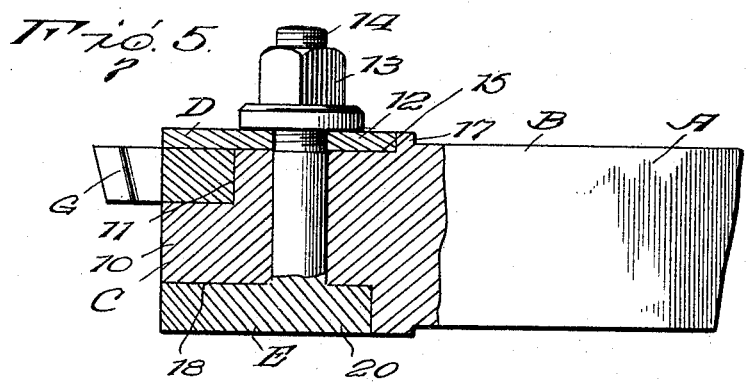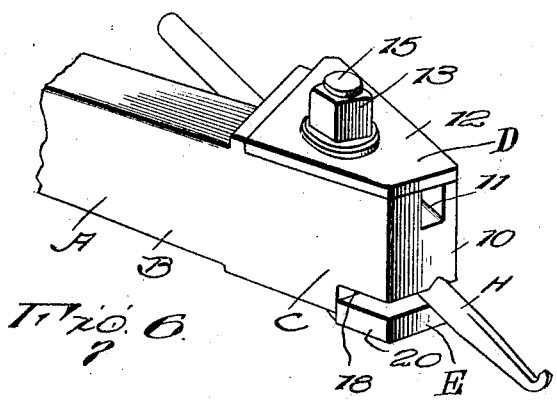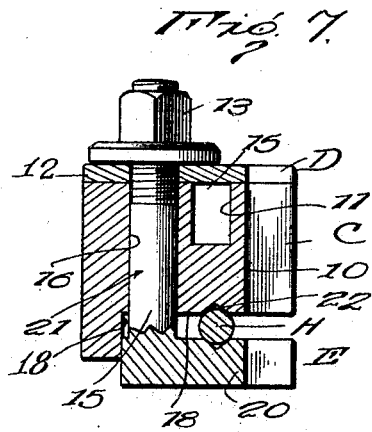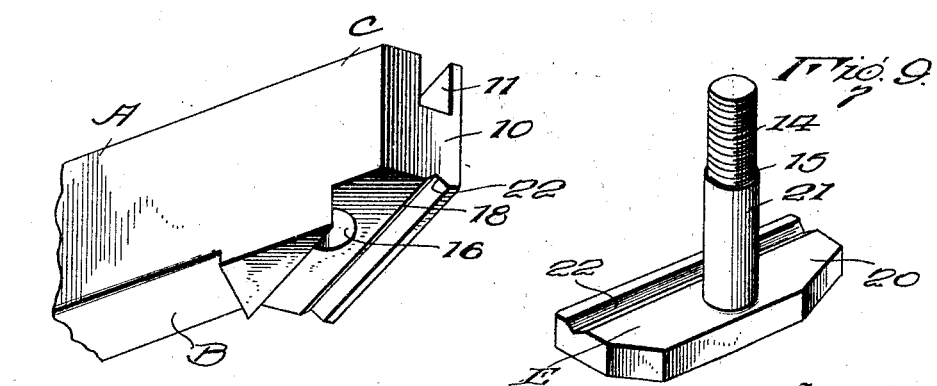

HENRY CURTIN, OF GLOVERSVILLE, NEW YORK.

TOOL-HOLDER.

1,395,262.

Specification of Letters Patent.

Patented Nov. 1, 1921.

Application filed December 18, 1919. Serial No. 345,801.

*To all whom it may concern:*

Be it known that I, HENRY CURTIN, a citizen of the United States, residing at Gloversville, in the county of Fulton and State of New York, have invented certain new and useful Improvements in Tool-Holders, of which the following is a specification.

This invention relates to a tool holder for use in a lathe or other metal working machine, and the primary object of the invention is the provision of an improved reversible tool holder capable of supporting either a tool for turning, threading, cutting off or planing or a tool for boring or internal threading.

Another object of the invention is the provision of an improved means for holding the tool in the holder, to permit tools having relatively long shanks to be accommodated, and permit the easy and quick placing or removal of a tool from the holder.

A further object of the invention is the provision of a tool holder having an angular related head provided with an improved means for securing different types of tools on each side thereof.

A still further object of the invention is the provision of an improved tool holder of the above character which is durable and efficient in use, one that is simple and easy to manufacture, and one which can be placed upon the market at a reasonable cost.

Other objects of the invention will appear in the following detailed description taken in connection with the accompanying drawings, forming a part of this specification, and in which drawings:

Figure 1 is a perspective view of the improved tool holder.

Fig. 2 is a fragmentary side elevation of the tool holder.

Fig. 3 is a bottom plan view of the same.

Fig. 4 is a detail transverse section through the head of the tool taken on the line 4—4 of Fig. 2.

Fig. 5 is a detail longitudinal section through the head of the holder.

Fig. 6 is a perspective view of the improved holder showing a tool for boring or internal threading positioned therein.

Fig. 7 is a detail transverse section through the same.

Fig. 8 is a detail perspective view of the tool head showing the clamping plate removed therefrom, and Fig. 9 is a detail perspective view of one of the clamping plates.

Referring to the drawings, in detail, wherein similar reference characters designate corresponding parts throughout the several views, the letter A indicates the improved tool holder including the shank B, the angular related head C, forming the stationary section for the jaws D and E for the tools G and H.

The shank B of the tool holder is of the ordinary shape and configuration to permit the same to be readily associated with the tool post of a lathe or the like, and is preferably formed from a single piece of suitable hard metal.

The head B is formed integrally therewith and extends at an angle thereto and includes a substantially truncated triangular block 10, which has one face thereof flush with one side face of the shank and is capable of holding the tools G and H at an angle to the shank. The upper face of the head B is provided with a longitudinally extending groove 11, which is so shaped as to snugly receive the shank of a turning, cutting or threading tool G and this groove extends parallel with the side face of the head, which extends at an angle to the shank B. The tool G is adapted to be clamped in adjusted position on the head and in the groove by a flat truncated triangular shaped plate 12 which forms the movable member of the clamp D. The plate 12 is shaped similar to the head C and extends flush with the upper surface of the head. The plate 12 is held in its locked or adjusted position in engagement with the upper face of the head and tool G by means of a nut 13 threaded on the externally outer threaded end 14 of the stud 15, which extends through the head of the holder. The plate 12 is held against rotation on the stud 15 by means of an upstanding rib 17, which extends at right angles to the shank at the meeting point thereof with the head.

The opposite face of the head B is provided with a cut out portion 18, which extends parallel with the groove 11 and forms an abrupt shoulder 19 which is adapted to be engaged by the substantially rectangular block 20 which is adapted to fit in the cut out portion 18 of the head C. The block 20 is adapted to fit flush with the outer surface of the head when the tool G is being held in position and when the tool H is not used. The block 20 forms the movable clamping jaw for the clamp E.

The stud 15 is carried by the inner face of the block 20 and extends perpendicular thereto and is arranged relatively near the inner edge of the plate. Thus it will be seen that when the nut 13 is adjusted on the stud, the plate 20 will be drawn into tight engagement with the lower face of the head C. The portion of the stud, which extends through the opening 16 formed in the head C of the tool holder is formed smooth, as at 21 and the threaded portion of the shank is made slightly smaller in diameter so as to prevent the breaking or scarring of the threads when the stud is moved through the openings.

The inner meeting faces of the block 20 and the head C is provided with longitudinally extending coöperating grooves 22 which are substantially V-shaped in cross section and are adapted to receive and hold the shank portion of the boring or internally screw threading tool H. The grooves 22 extend parallel and in alinement with the groove 11.

In operation of the improved tool, when it is desired to plane, or cut a piece of metal or the like, the tool G which is of the ordinary or any preferred construction is placed in the groove 11 after which the nut 13 is threaded on the portion 14 of the stud 15 into tight engagement with the plate 12 which forces the same into tight engagement with the shank of the tool G thus firmly clamping the tool in position.

When it is desired to bore or internally thread the work, the tool G is removed from the holder and the nut 13 loosened and the tool H placed in the coöperating grooves 22, after which the nut 13 is adjusted against the plate 12, which brings the block 20 into tight engagement with the tool H and thus prevents movement of the same in relation to the head C.

The tool H is of the ordinary or any preferred construction.

From the foregoing description it can be seen that an improved tool holder is provided of exceptionally simple and durable construction, which can be reversed and effectively used for holding either a planing tool or the like or a boring and internally threading tool.

Changes in details may be made without departing from the spirit or scope of this invention, but;

I claim:

1. A tool holder comprising a shank, an angular related stationary jaw formed on the shank, clamping jaws carried by the opposite sides of the stationary jaw for movement toward and away from said stationary jaw; and means for adjusting the clamping jaws toward and away from said head.

2. A tool holder for lathes or the like comprising a shank, an angular related head having a groove formed in one face of the same extending parallel with the inclination of the head and adapted to receive a planing tool or the like, a plate arranged to overlie said groove and engage said tool, the opposite face of the head being cut away, a block inserted in said cut away portion, the block and the last mentioned face of the tool having alined longitudinally extending grooves formed in their meeting faces arranged in alinement with and parallel to the first mentioned groove, the head having a bore formed therein arranged to one side of the grooves, a stud carried by the block for insertion in said bore, and a nut adapted to be turned on said stud and be brought into engagement with said plate.

3. A tool holder comprising a shank, a stationary jaw formed on the shank having its opposite sides provided with working faces, shaped respectively to receive a cylindrical shaped tool shank and a polygonal shaped tool shank, and movable jaws carried by the stationary jaw and arranged for movement toward and away from the opposite working faces thereof.

HENRY CURTIN.